(No Model.)

H. W. BLOOD.
MOLD FOR CARRIAGE OR BUGGY TOPS.

No. 259,265. Patented June 6, 1882.

WITNESSES
Fred. G. Dieterich
Charles H. Bates

INVENTOR
Henry W. Blood,
by Louis Bagger & Co.
Attorneys

UNITED STATES PATENT OFFICE.

HENRY W. BLOOD, OF ERIE, PENNSYLVANIA.

MOLD FOR CARRIAGE OR BUGGY TOPS.

SPECIFICATION forming part of Letters Patent No. 259,265, dated June 6, 1882.

Application filed March 13, 1882. (No model.)

*To all whom it may concern:*

Be it known that I, HENRY W. BLOOD, of Erie, in the county of Erie and State of Pennsylvania, have invented certain new and useful Molds or Formers for Carriage and Buggy Tops; and I do hereby declare that the following is a full, clear, and exact description of the invention, which will enable others skilled in the art to which it appertains to make and use the same, reference being had to the accompanying drawings, which form a part of this specification, and in which—

Figure 1:
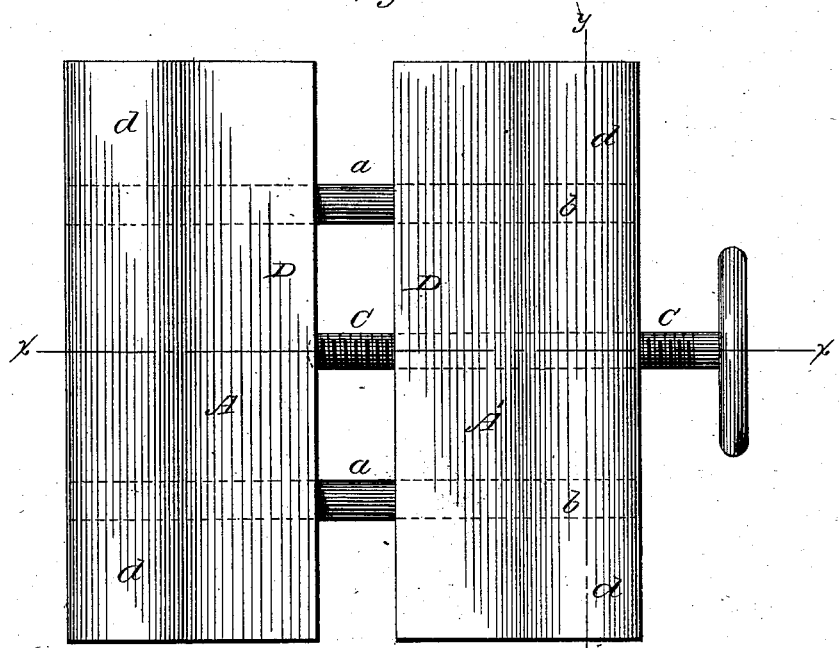
Figure 2:
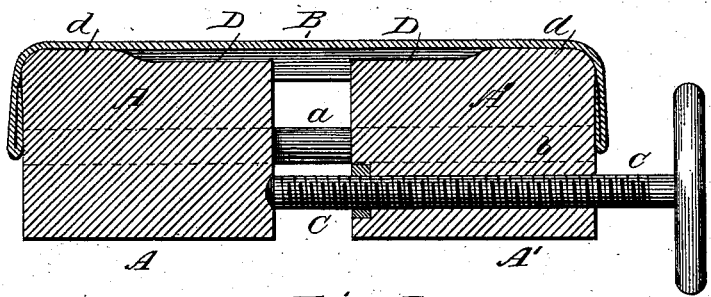
Figure 3:
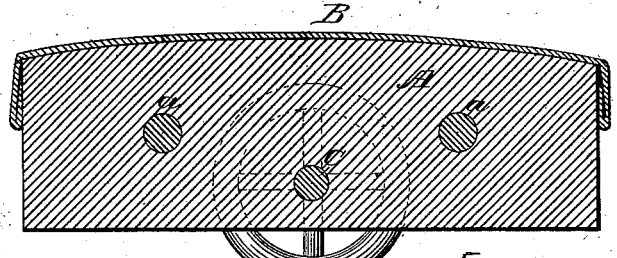

Figure 1 is a top view of my improved mold or former used in the manufacture of seamless carriage and buggy tops. Fig. 2 is a cross-section of the same through line $x\,x$, Fig. 1, showing the top stretched over it; and Fig. 3 is a longitudinal section of the form, with the top stretched over it, through line $y\,y$ in Fig. 1. Similar letters of reference indicate corresponding parts in all the figures.

My improvement contemplates an improved method of manufacturing seamless calash-tops for buggies and other vehicles, as hereinafter more fully described and claimed.

In the accompanying drawings, A A' are the two sections of the block or form over which the top (shown at B in Figs. 2 and 3) is stretched and molded. These sections may be adjusted a greater or less distance from each other, according to the width which the finished top is to have, by a connecting-screw, C, the two parts A and A' being held in their proper relative position by means of guide-pins $a\,a$, which project from the inner side of one of the halves, A, into corresponding bores, $b\,b$, in the opposite part, A'. The rounded top part of the mold-block A A' is concaved longitudinally, as shown at D, so as to leave a convex raised part or ridge, $d$, along each side, as will appear more clearly by reference to Fig. 2. After the top B has been stretched over the form and the blocks A A' adjusted by screw C, to give the proper tension, the rounded or convex ribs $d\,d$ will give the proper shape and conformation to the sides of the top, which is enabled to yield to receive its shape on account of the depression or concavity D. To prevent the top from slipping off of or becoming displaced upon the mold during the operation of stretching and shaping, it may be tacked to the sides of the mold-block or former along the lower edge.

Having thus described my invention, I claim and desire to secure by Letters Patent of the United States—

A mold for buggy and carriage tops, composed of two halves or sections, A and A', of the shape shown, with a concavity, D, between the parallel rounded side ribs, $d\,d$, and provided with the adjusting-screw C, guide-pins $a\,a$, and bores $b\,b$, to receive said guide-pins, substantially as and for the purpose set forth.

In testimony that I claim the foregoing as my own I have hereunto affixed my signature in presence of two witnesses.

HENRY W. BLOOD.

Witnesses:
 J. A. SARGENT,
 JAS. DEWITT.